United States Patent
Hegde et al.

(10) Patent No.: US 11,556,492 B1
(45) Date of Patent: Jan. 17, 2023

(54) SYNCHRONOUS SERIAL INTERFACE ALLOWING COMMUNICATION WITH MULTIPLE PERIPHERAL DEVICES USING A SINGLE CHIP SELECT

(71) Applicant: Texas Instruments Incorporated, Dallas, TX (US)

(72) Inventors: Ganapathi Hegde, Bengaluru (IN); Krushal Shah, Dallas, TX (US); Mayank Garg, Murphy, TX (US); Luis Eduardo Ossa, Plano, TX (US); Vashist Bist, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/363,106

(22) Filed: Jun. 30, 2021

(51) Int. Cl.
  *G06F 13/42* (2006.01)
(52) U.S. Cl.
  CPC ...... *G06F 13/4221* (2013.01); *G06F 13/4282* (2013.01)
(58) Field of Classification Search
  CPC .......................... G06F 13/4221; G06F 13/4282
  See application file for complete search history.

(56) References Cited

U.S. PATENT DOCUMENTS

| | | | | |
|---|---|---|---|---|
| 5,748,684 A | * | 5/1998 | Sanchez | H04L 25/40 375/357 |
| 2009/0138638 A1 | * | 5/2009 | Russo | G06F 13/4291 710/110 |
| 2018/0246830 A1 | * | 8/2018 | Zhu | G06F 13/385 |
| 2019/0129880 A1 | * | 5/2019 | Zhu | G06F 13/4282 |
| 2020/0065280 A1 | * | 2/2020 | Huang | G06F 13/362 |

OTHER PUBLICATIONS

Enhanced Serial Peripheral Interface (eSPI): Interface Base Specification (for Client and Server Platforms); Revision 1.0; Intel Corporation; pp. 1-52; Jan. 2016. (Year: 2016).*

* cited by examiner

*Primary Examiner* — Glenn A. Auve
(74) *Attorney, Agent, or Firm* — John R. Pessetto; Frank D. Cimino

(57) ABSTRACT

A synchronous serial bus peripheral circuit includes a peripheral identification (ID) register and a state machine circuit. The state machine circuit is coupled to the peripheral ID register, and is configured to transmit a status value based on a peripheral ID field of data received via the receiver shift register equaling a value stored in the peripheral ID register.

20 Claims, 9 Drawing Sheets

READ ADDRESS UPDATE     DLEN=0, CRCEN=0, R/W=1

| CMD[7:0] | ADDR[7:0] |
|---|---|
| | DEV_STS |

FIG. 3A

SINGLE WRITE - 16-BIT     DLEN=0, CRCEN=0, R/W=0

| CMD[7:0] | ADDR[7:0] | WDATA[15:0] |
|---|---|---|
| | DEV_STS | RDATA[15:0] |

FIG. 3B

SINGLE WRITE WITH ECC - 16-BIT     DLEN=0, CRCEN=1, R/W=0

| CMD[7:0] | ADDR[7:0] | WDATA[15:0] | CRC-8 |
|---|---|---|---|
| | DEV_STS | RDATA[15:0] | CRC-8 |

FIG. 3C

MULTI-WRITE - 2x16-BIT     DLEN=1, CRCEN=1, R/W=0

| CMD[7:0] | ADDR[7:0] | WDATA0[15:0] | WDATA1[15:0] | CRC-8 |
|---|---|---|---|---|
| | DEV_STS | RDATA0[15:0] | RDATA1[15:0] | CRC-8 |

FIG. 3D

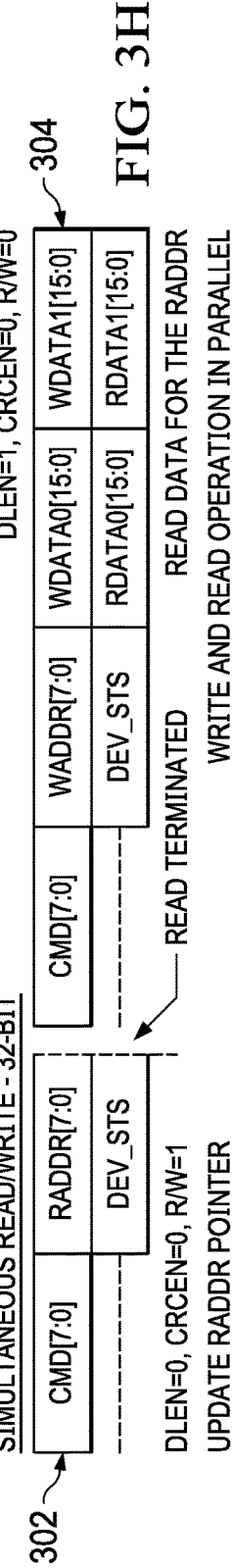

US 11,556,492 B1

SYNCHRONOUS SERIAL INTERFACE ALLOWING COMMUNICATION WITH MULTIPLE PERIPHERAL DEVICES USING A SINGLE CHIP SELECT

BACKGROUND

Computers and other electronic systems use serial interfaces to provide for transfer of data between connected devices. Serial peripheral interface (SPI) is one type of serial communication interface that provides synchronous transfer of data between a host device, such as a microcontroller, and one or more peripherals (peripheral devices). In SPI, the host device generates a clock signal, a select signal and an input data signal (e.g., data transferred to the peripheral devices). The peripheral devices receive the input data signal synchronous with the clock signal while the select signal is active, and generate, synchronous with the clock signal, a data output signal for reception by the host device.

SUMMARY

In one example, a synchronous serial bus peripheral circuit includes a peripheral identification (ID) register and a circuit. The circuit is coupled to the peripheral ID register, and is configured to transmit a status value based on a peripheral ID field of data received via the receiver shift register equaling a value stored in the peripheral ID register.

In another example, a method includes activating, by a host device coupled to a synchronous serial bus, a chip select signal to initiate a data frame on the synchronous serial bus. The host device transmits peripheral ID value and an address value in the data frame. A peripheral device coupled to the synchronous serial bus receives the peripheral ID value and the address value in the data frame. The peripheral device compares the peripheral ID value to a general call ID and a peripheral ID assigned to the peripheral device. Responsive to the peripheral ID value being equal to the peripheral ID assigned to the peripheral device, the peripheral device transmits, in the data frame, a status value while receiving the address value.

In a further example, a motor controller includes a synchronous serial bus peripheral circuit. The synchronous serial bus peripheral circuit is for communicating with an external controller. The synchronous serial bus peripheral circuit includes a peripheral identification (ID) register, a receiver shift register, and a control circuit. The control circuit is coupled to the peripheral ID register and the receiver shift register, and is configured to transmit a status value to the external controller based on a peripheral ID field received via the receiver shift register equaling a value stored in the peripheral ID register.

BRIEF DESCRIPTION OF THE DRAWINGS

For a detailed description of various examples, reference will now be made to the accompanying drawings in which:

FIGS. 3A-3H show example transactions using a synchronous serial bus as described herein.

The same reference numbers and reference designators are used in the drawings to designate the same or similar (functionally and/or structurally) features.

DETAILED DESCRIPTION

The serial peripheral interface (SPI) is a point-to-point synchronous serial communication interface. In conventional SPI, a host device provides a dedicated chip select for each peripheral device that communicates with the host device. Thus, in a system communicating via SPI, a host device must provide as many chip selects as there are peripheral devices coupled to the host device. The requirement for individual chip selects limits the number of peripheral devices that can be accommodated in the system. To reduce the number of chip selects needed, peripheral devices may be daisy-chained. However, a failure anywhere in the chain of peripherals affects communication with all of the peripherals.

The synchronous serial interface described herein allows a host device to communicate with multiple peripheral devices, arranged in parallel, using a single chip select. The synchronous serial interface adds framing to the underlying physical layer (e.g., the SPI physical layer, referred to as a PHY), where a data frame includes a command field, an address field, a data field, and a check field. Applying the data frame and associated fields, a host device can randomly access the registers of multiple peripheral devices using a single chip select. In some embodiments, the host device can simultaneously write to multiple peripheral devices using a peripheral identification (ID) value reserved as a "general call" ID. The host device can also simultaneously read and write registers at the same address or different addresses of a peripheral device. The peripheral devices may include conflict detection that monitors bus activity and detects conflicts on the serial bus.

The synchronous serial interface described herein is suitable for use in various applications that implement synchronous serial communication. For example, the synchronous serial communication interface may be used in applications that employ SPI for communication, such as motor control applications and other microcontroller communication applications.

Figure 1:
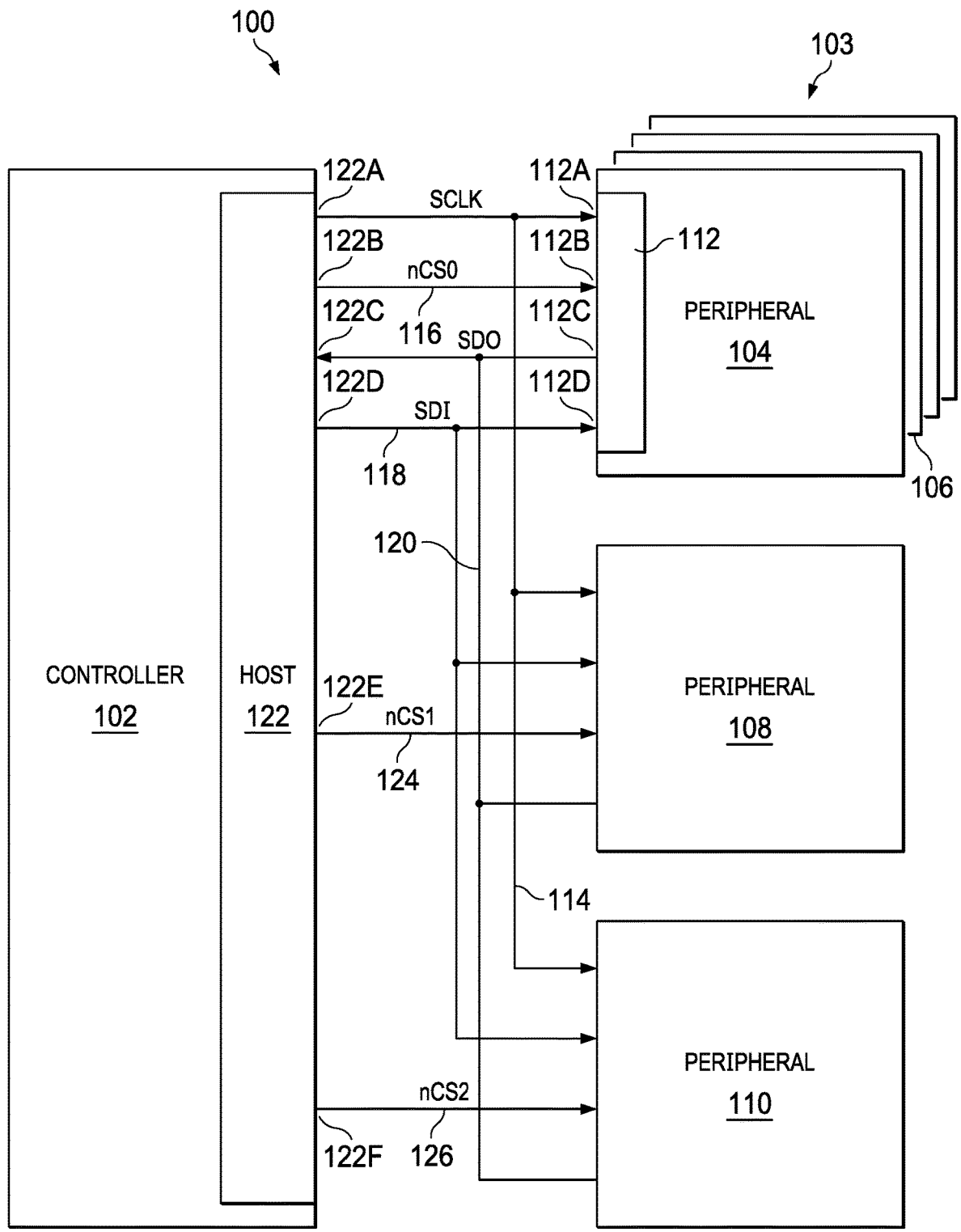
FIG. 1 shows a block diagram for an example system that includes a synchronous serial bus as described herein.

FIG. 1 shows a block diagram for a system 100 that communicates via a synchronous serial communication interface as described herein. The system 100 includes controller 102, peripheral devices 103 (including peripheral devices 104 and 106), a peripheral device 108, and a peripheral device 110. The controller 102 communicates with the peripheral devices 103, the peripheral device 108, and the peripheral device 110 via a synchronous serial communication interface, which may be SPI compatible in some embodiments of the system 100. The controller 102 is a control circuit, such as a microcontroller, and includes a synchronous serial bus host circuit 122 that provides an interface for communication with the peripheral devices 103, peripheral device 108, and peripheral device 110.

The synchronous serial bus host circuit 122 includes a clock output 122A, a data output 122D, a data input 122C, and chip select outputs 122B, 122E, and 122F. The synchronous serial bus host circuit 122 provides a clock signal 114 (serial bus clock signal) to the peripheral devices 103, the peripheral device 108, and the peripheral device 110 via the clock output 122A. The synchronous serial bus host circuit 122 transmits data to the peripheral devices 103, the peripheral device 108, and the peripheral device 110 via the data output 122D, and receives data from the peripheral devices 103, the peripheral device 108, and the peripheral device 110 via the data input 122C. The synchronous serial bus host circuit 122 activates a chip select signal 124 via the chip select output 122E to enable communication with the peripheral device 108, and activates a chip select signal 126 via the chip select output 122F to enable communication with the peripheral device 110. The synchronous serial bus host circuit 122 activates a chip select signal 116 via the chip select output 1226 to enable communication with one or more of the peripheral devices 103.

The peripheral devices 103 include peripheral device 104 and peripheral device 106. In practice, the peripheral devices 103 may include one more peripheral devices. Each of the peripheral devices 103 includes a synchronous serial bus peripheral circuit 112. The synchronous serial bus peripheral circuit 112 includes a clock input 112A, a chip select input 112B, a serial data output 112C, and a serial data input 112D. The clock input 112A is coupled to the clock output 122A of the synchronous serial bus host circuit 122 for receipt of the clock signal 114. The synchronous serial bus peripheral circuit 112 applies the clock signal 114 to synchronize data reception and transmission. The chip select input 1126 is coupled to the chip select output 1226 for receipt of the chip select signal 116. The serial data output 112C is coupled to data input 122C of the synchronous serial bus host circuit 122, and the synchronous serial bus peripheral circuit 112 provides a data signal 120 to the synchronous serial bus host circuit 122 via the serial data output 112C. The serial data input 112D is coupled to the data output 122D for receipt of the data signal 118 from the synchronous serial bus host circuit 122.

Figure 2:
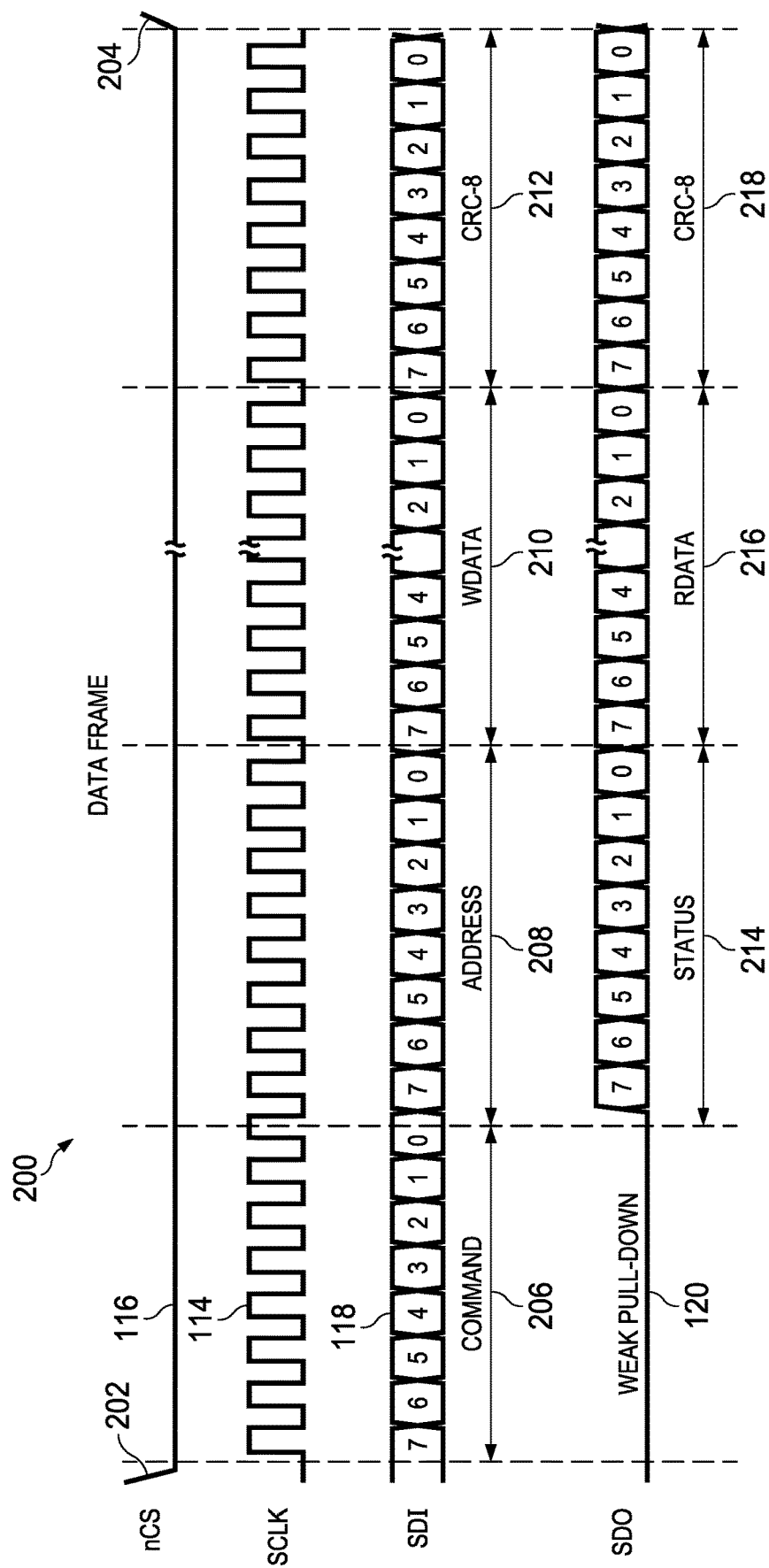
FIG. 2 is a timing diagram of example signals of a synchronous serial bus as described herein.

To enable communication between the controller 102 and the peripheral devices 103, where each of the peripheral devices 103 is coupled to the chip select output 122B for receipt of the chip select signal 116, the synchronous serial bus peripheral circuit 112 communicates with peripheral devices 103 via data frames defined by the chip select signal 116 and the data signal 118. FIG. 2 shows an example of a data frame 200 generated by the synchronous serial bus host circuit 122. The synchronous serial bus host circuit 122 may be a conventional synchronous serial bus host circuit (e.g., a conventional SPI host) with frame generation provided by software executed by the controller 102. The synchronous serial bus host circuit 122 initiates the data frame 200 by activating the chip select signal 116 at leading edge 202, and terminates the data frame 200 by deactivating the chip select signal 116 at trailing edge 204. The data frame 200*t* includes a command field 206, an address field 208, a write data field 210, and check field 212 for transfer of information from the synchronous serial bus host circuit 122 to the synchronous serial bus peripheral circuit 112. The command field 206 and the address field 208 form a header of the data frame 200.

The command field 206 may include sub-fields, such as: a peripheral identification (ID) field, a read/write field, a data length field, and/or a check enable field. The peripheral ID sub-field may include a peripheral ID value that selects one or more of the peripheral devices 103 for communication. For example, a 4-bit peripheral ID field may be used to select one of 15 different peripheral devices. In some embodiments, one value of the peripheral ID field may be used as a "general call" ID value that selects all of the peripheral devices 103 receiving the data frame 200 to perform a write operation.

The read/write sub-field may specify whether data provided in the write data field 210 is to be written to a register of the synchronous serial bus peripheral circuit 112 (a write operation is to be performed) and/or data read from a register of the synchronous serial bus peripheral circuit 112 is to be transferred to the synchronous serial bus host circuit 122 (a read operation is to be performed) via the data frame 200. The data frame 200 may allow simultaneous writing and reading of data in the synchronous serial bus peripheral circuit 112. In a data frame 200, read data may be provided from a different address than the address to which data is written in the data frame 200.

The data length field may specify a number of data bytes or data words (e.g., 16-bit data values) to be transferred in the write data field 210. For example, the number of data words to be transferred may be equal to the value of the data length field plus one in some embodiments. In some embodiments of the data frame 200, the number of bytes or words transferred may be defined by the active duration of the chip select signal 116, rather than by the value of a data length field.

The check enable field may specify whether the synchronous serial bus peripheral circuit 112 is to include a check character (e.g., parity or cyclic redundancy check) in the data transmitted to the synchronous serial bus host circuit 122. The check enable field may be provided at various locations within the command field 206 (e.g., at the end or the middle of the command field 206).

The address field 208 specifies a value that identifies a register of the synchronous serial bus peripheral circuit 112 to be written and/or read by the data frame 200. For example, the address field 208 may specify a first (a starting address) of multiple sequential registers to be written and/or read by the data frame 200.

The write data field 210 contains data bytes or data words transferred from the synchronous serial bus host circuit 122 to the synchronous serial bus peripheral circuit 112. That is, the write data field 210 contains data that is to be written to a register identified by the value specified in the address field 208.

The check field 212 contains a check value that may be used by the synchronous serial bus peripheral circuit 112 to verify and/or correct the data provided in the command field 206, the address field 208, and/or the write data field 210. For example, the check field 212 in may contain an 8-bit cyclic redundancy check value computed by the synchronous serial bus host circuit 122 based on the command field 206, the address field 208, and/or the write data field 210. In the data frame 200, the data signal 120 transfers data from the synchronous serial bus peripheral circuit 112 to the synchronous serial bus host circuit 122. The frame 200 includes a status field 214, a read data field 216, and a check field 218. In the status field 214, the read data field 216, and the check field 218, the data signal 120 is driven by one of the synchronous serial bus peripheral circuits 112 having a peripheral ID value that is equal to the peripheral ID value received in the command field 206. The status field 214 is transmitted coincident with reception of the address field 208. The status field 214 may include various status values specifying the condition of the synchronous serial bus peripheral circuit 112 and/or the peripheral devices 103. Examples of status values include fault codes (such as write data verification errors) and operational status codes.

The read data field 216 contains data bytes or data words transferred from the synchronous serial bus peripheral circuit 112 to the synchronous serial bus host circuit 122. That is, the read data field 216 contains data that is read from a register of the synchronous serial bus peripheral circuit 112. An address of the register to be read may be specified in the address field 208 of the data frame 200 currently being received or a data frame 200 previously received.

The check field 218 contains a check value that may be used by the synchronous serial bus host circuit 122 to verify and/or correct the data provided in the status field 214 and/or the read data field 216. For example, the status field 214 may contain an 8-bit cyclic redundancy check value computed by the synchronous serial bus peripheral circuit 112 based on the status field 214 and/or the read data field 216.

FIGS. 3A-3H show example transactions using a synchronous serial bus as described herein. In FIG. 3A, the synchronous serial bus host circuit 122 transmits a command field and an address field to set an address for register reads in the synchronous serial bus peripheral circuit 112 during a subsequent frame. While receiving the address field, the synchronous serial bus peripheral circuit 112 transmits a status value to the synchronous serial bus host circuit 122. In one example, the data length field is set to 0, the read/write field is set to 1 to indicate the read pointer in the synchronous serial bus peripheral circuit 112 is to set to the value contained in the address field, and the check enable field is set to 0 to indicate that no check value is to be provided.

In FIG. 3B, the synchronous serial bus host circuit 122 transmits a command field, an address field, and a data word to the synchronous serial bus peripheral circuit 112 identified in the command field (the peripheral ID sub-field). The address contained in the address field specifies the register to be written. While receiving the address field, the synchronous serial bus peripheral circuit 112 transmits a status value to the synchronous serial bus host circuit 122. While receiving the data word to be written to, the synchronous serial bus peripheral circuit 112 transmits a register value (e.g., the current value of the register to be written to or the value of the register designated by the current value of a read pointer of the synchronous serial bus peripheral circuit 112). In one example of a single word write/read frame as shown in FIG. 3B, in the command field, the data length field is set to 0, the read/write field is set to 0 (to indicate the write pointer in the synchronous serial bus peripheral circuit 112 is to be set to the value contained in the address field and a register corresponding to the write pointer is to be written), and the check enable field is set to 0 to indicate that no check value is to be provided.

FIG. 3C is similar to FIG. 3B, and illustrates a transaction in which the synchronous serial bus host circuit 122 writes a data word, and provides a check value to verify and/or correct the data transferred from the synchronous serial bus host circuit 122. The synchronous serial bus peripheral circuit 112 to which the transaction is directed transmits status, a read value, and a check value to the synchronous serial bus host circuit 122. In one example, the data length field is set to 0, the read/write field is set to 0 to indicate the write pointer in the synchronous serial bus peripheral circuit 112 is to be set to the value contained in the address field and a register corresponding to the write pointer is to be written, and the check enable field is set to 1 to indicate that a check value is to be provided.

FIG. 3D is similar to FIG. 3C, and illustrates a transaction in which the synchronous serial bus host circuit 122 writes two data words, and provides a check value to verify and/or correct the data transferred from the synchronous serial bus host circuit 122. The synchronous serial bus peripheral circuit 112 to which the transaction is directed transmits status, two read values, and a check value to the synchronous serial bus host circuit 122. In one example, the data length field is set to 1 to indicate that two data words are to be transferred, the read/write field is set to 0 to indicate the write pointer in the synchronous serial bus peripheral circuit 112 is to be set to the value contained in the address field and register corresponding to the write pointer is to be written, and the check enable field is set to 1 to indicate that a check value is to be provided.

FIG. 3E is similar to FIG. 3D, and illustrates a transaction in which the synchronous serial bus host circuit 122 writes three data words, and provides a check value to verify and/or correct the data transferred from the synchronous serial bus host circuit 122. The synchronous serial bus peripheral circuit 112 to which the transaction is directed transmits status, three read values, and a check value to the synchronous serial bus host circuit 122. In one example, the data length field is set to 2 to indicate that three data words are to be transferred, the read/write field is set to 0 to indicate the write pointer in the synchronous serial bus peripheral circuit 112 is to be set to the value contained in the address field and register corresponding to the write pointer is to be written, and the check enable field is set to 1 to indicate that a check value is to be provided.

FIG. 3F is similar to FIG. 3E, and illustrates a transaction in which the synchronous serial bus host circuit 122 transfers four data words, and provides a check value to verify and/or correct the data transferred from the synchronous serial bus host circuit 122. The synchronous serial bus peripheral circuit 112 to which the transaction is directed transmits status, four read values, and a check value to the synchronous serial bus host circuit 122. In one example, the data length field is set to 3 to indicate that four data words are to be transferred, the read/write field is set to 0 to indicate the write pointer in the synchronous serial bus peripheral circuit 112 is to be set to the value contained in the address field and register corresponding to the write pointer is to be written, and the check enable field is set to 1 to indicate that a check value is to be provided.

FIG. 3G shows a single word read transaction. In FIG. 3G, the synchronous serial bus host circuit 122 transmits a command field, an address field, and a dummy data word to the synchronous serial bus peripheral circuit 112 identified in the command field (the peripheral ID field). In some example embodiments, the write data field and the CRC field are ignored during read transactions. The address contained in the address field specifies the register to be read. While receiving the address field, the synchronous serial bus peripheral circuit 112 transmits a status value to the synchronous serial bus host circuit 122. While receiving the dummy data word, the synchronous serial bus peripheral circuit 112 transmits a register value (e.g., the value of the register identified in the address field). In one example, the data length field is set to 0, the read/write field is set to 1 to indicate the read pointer in the synchronous serial bus peripheral circuit 112 is to be set to the value contained in the address field, and the check enable field is set to 0 to indicate that no check value is to be provided.

FIG. 3H shows a two-frame transaction that allows simultaneous reading and writing from two different addresses. The first frame sets the read pointer as shown in FIG. 3A. In the second frame, the synchronous serial bus host circuit 122 writes two data words to the synchronous serial bus peripheral circuit 112, and simultaneously reads two data words the from the synchronous serial bus peripheral circuit 112. The two data words read from the synchronous serial bus peripheral circuit 112 are read from the register at the address value transferred in the first frame and the next register in the peripheral device 112, and the two data words transferred from the host in the second frame are written to registers of the synchronous serial bus peripheral circuit 112 at the address value transferred in the second frame and the next register in the peripheral device 112. The read pointer and write pointers are incremented with each successive data word transfer of the second frame. In one example of the second frame, the data length field is set to 1 to indicate that two data words are to be transferred, the read/write field is set to 0 to indicate the write pointer in the synchronous serial bus peripheral circuit 112 is to be set to the value contained in the address field and the register corresponding to the write pointer is to be written, and the check enable field is set to 0 to indicate that no check value is to be provided.

The two-frame transaction of FIG. 3H may be used to simultaneously read from a first peripheral device (e.g., the peripheral device 106) and write to a second peripheral device (e.g., the peripheral device 104). In such operation, the frame 302 is addressed to the peripheral device 106 and sets the read pointer of the peripheral device 106 as shown in and explained with regard to FIG. 3A. The frame 302 is terminated prior to transmission of read data by the peripheral device 106. The frame 302 is terminated prior to transmission of read data to enable the peripheral device 106 to transmit the read data in the subsequent frame (frame 304). Thus, in the frame 304, as the peripheral device 104 receives write data, the peripheral device 106 transmits read data. The frame 302 may set the read pointer of the peripheral device 106 to a different address than the address loaded into the write pointer of the peripheral device 104 by the frame 304.

Figure 4:
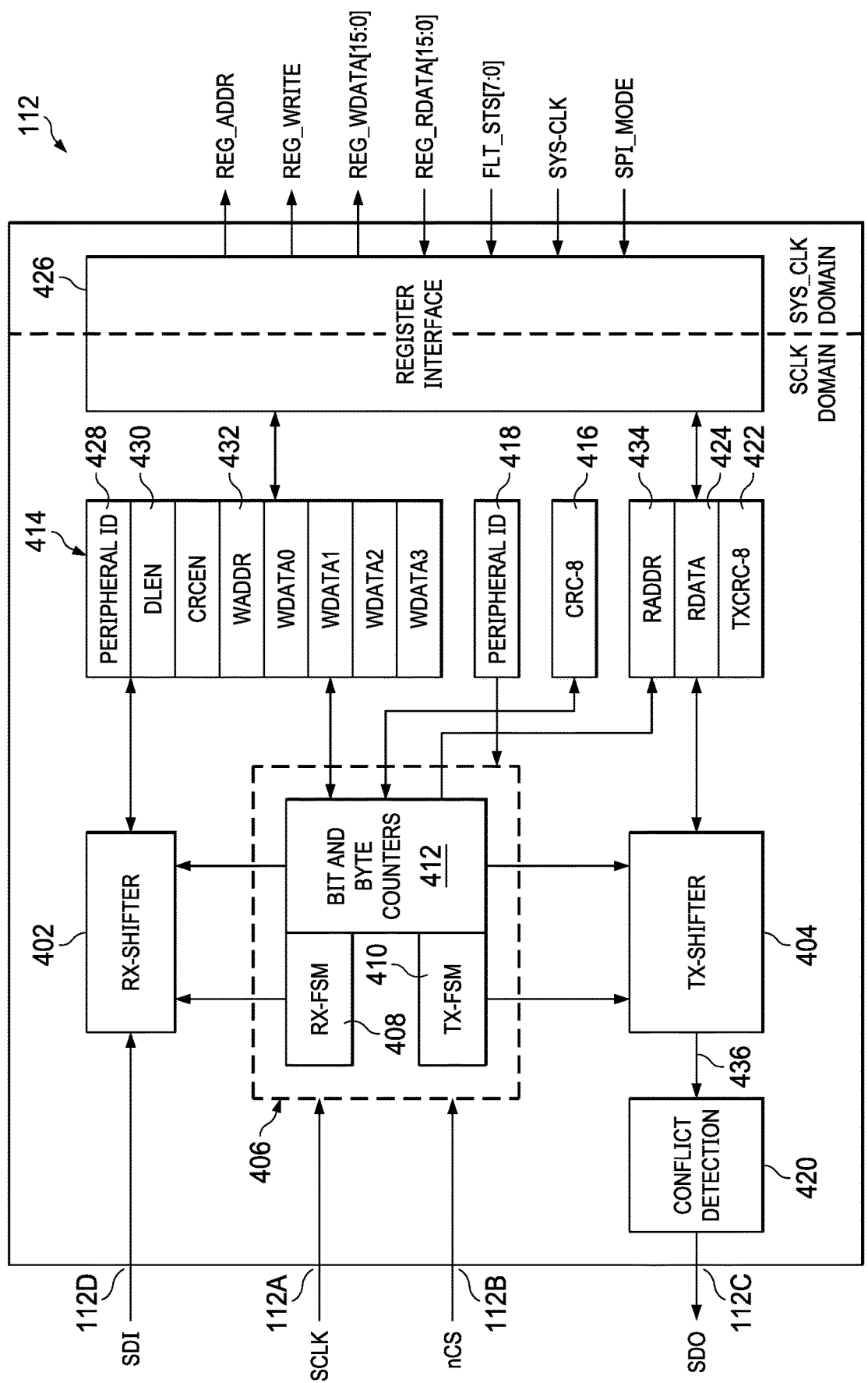
FIG. 4 shows a block diagram for a synchronous serial bus peripheral interface circuit suitable for use in a synchronous serial bus as described herein.

FIG. 4 shows a block diagram for an example synchronous serial bus peripheral circuit 112. The synchronous serial bus peripheral circuit 112 includes a receiver shift register 402, a transmitter shift register 404, a state machine circuit 406, receive registers 414, a receiver check circuit 416, a peripheral ID register 418, a conflict detection circuit 420, a transmit check circuit 422, a read data register 424, and a register interface 426. The receiver shift register 402 receives serial data received at the serial data input 112D at edges of the clock signal 114 received at the clock input 112A for conversion from serial to parallel format. The transmitter shift register 404 converts parallel data bytes or words to serial format for transmission via the serial data output 112C. The transmitter shift register 404 shifts at edges of the clock signal received at the clock input 112A.

The receiver shift register 402 and the transmitter shift register 404 are controlled by the state machine circuit 406. The state machine circuit 406 is a control circuit that may implemented using dedicated circuitry, a microcontroller, etc. The state machine circuit 406 includes a receive finite state machine (FSM) 408, a transmit FSM 410, and counters 412. The receive FSM 408 controls reception of data via the receiver shift register 402, and the transmit FSM 410 controls transmission of data via the transmitter shift register 404. The counters 412 count the bits and/or bytes received in a frame to identify the frame fields. For example, the receive FSM 408 detects the start of a frame at the leading edge of the chip select signal 116, and enables the counters 412 to count rising or falling edges of the clock signal 114. In an embodiment of the synchronous serial bus peripheral circuit 112 that applies the frame formatting of FIG. 2, when the counters 412 have counted 8 edges of the clock signal 114, the receive FSM 408 recognizes that a command field has been received and transfers the command data, and various sub-fields thereof, from the receiver shift register 402 to the receive registers 414. A peripheral ID value is transferred from the receiver shift register 402 to the peripheral ID register 428, a data length value is transferred from the receiver shift register 402 to the data length register 430, etc. Some embodiments of the receive FSM 408 may transfer sub-field values from the receiver shift register 402 to the receive registers 414 as soon as each sub-field is received. The receive FSM 408 compares the peripheral ID stored in the peripheral ID register 428 to the peripheral ID value that is assigned to the synchronous serial bus peripheral circuit 112 and stored in the peripheral ID register 418. If the peripheral ID stored in the peripheral ID register 428 matches the peripheral ID value stored in the peripheral ID register 418 or matches a general call ID value, then frame reception continues. The general call ID is a broadcast ID that allows all instances of the synchronous serial bus peripheral circuit 112 receiving a frame to respond to the frame.

Having received the command field and determined that the synchronous serial bus peripheral circuit 112 is to respond to the frame, when the receive FSM 408 counts a next 8 edges of the clock signal 114, the receive FSM 408 recognizes that an address field has been received and transfers the address value from the receiver shift register 402 to the write pointer 432 (an address register) and/or the read pointer 434 (an address register). After receipt of the address field, the receive FSM 408 recognizes receipt of data bytes/words based on the count of edges provided by the counters 412, and transfers received data bytes/words to the receive registers 414 (e.g., to a write data register WDATA0-WDATA3). When a number of data values specified by the data length register 430 has been received, if a check value is provided in the received data (as indicated by the command field), the receive FSM 408 recognizes receipt of the check value. The receiver check circuit 416 applies the check value and the received data protected by the check value to determine whether an error is present in the received data, and to correct the error in some implementations.

The transmit FSM 410 recognizes the various transmission fields and controls transfer of data to and from the transmitter shift register 404 based on count of edges of the clock signal 114. For example, at the start of a frame, the transmit FSM 410 may transfer a status value provided via the register interface 426 to the transmitter shift register 404. When the counters 412 have counted the first 8 edges of the clock signal 114 in the frame, and if the synchronous serial bus peripheral circuit 112 is selected (by receipt of peripheral ID of the synchronous serial bus peripheral circuit 112 or a general call ID) the transmit FSM 410 will initiate shifting of the status value to the serial data output 112C at the edges of the clock signal 114. After the status value has been shifted out, the transmit FSM 410 will successively shift out read data values selected via the read pointer 434 and provided via the register interface 426 and the read data register 424. The transmit check circuit 422 computes a check value based on the data transmitted, and when data transmission is complete, the transmit FSM 410 loads the check value into the transmitter shift register 404 and serially transmits the bits of the check value.

The register interface 426 transfers received data stored in the receive registers 414 to circuitry external to the synchronous serial bus peripheral circuit 112. For example, the register interface 426 transfers write data values received via the receiver shift register 402 to registers external to the synchronous serial bus peripheral circuit 112 (e.g. registers or other storage devices within peripheral device 103 but external to circuit 112). The register interface 426 also transfers data (from, for example, peripheral device 103) to be transmitted via the synchronous serial bus peripheral circuit 112 to the read data register 424. For example, the register interface 426 transfers status values and read data values to the read data register 424 for transmission via the transmitter shift register 404.

Figure 5:
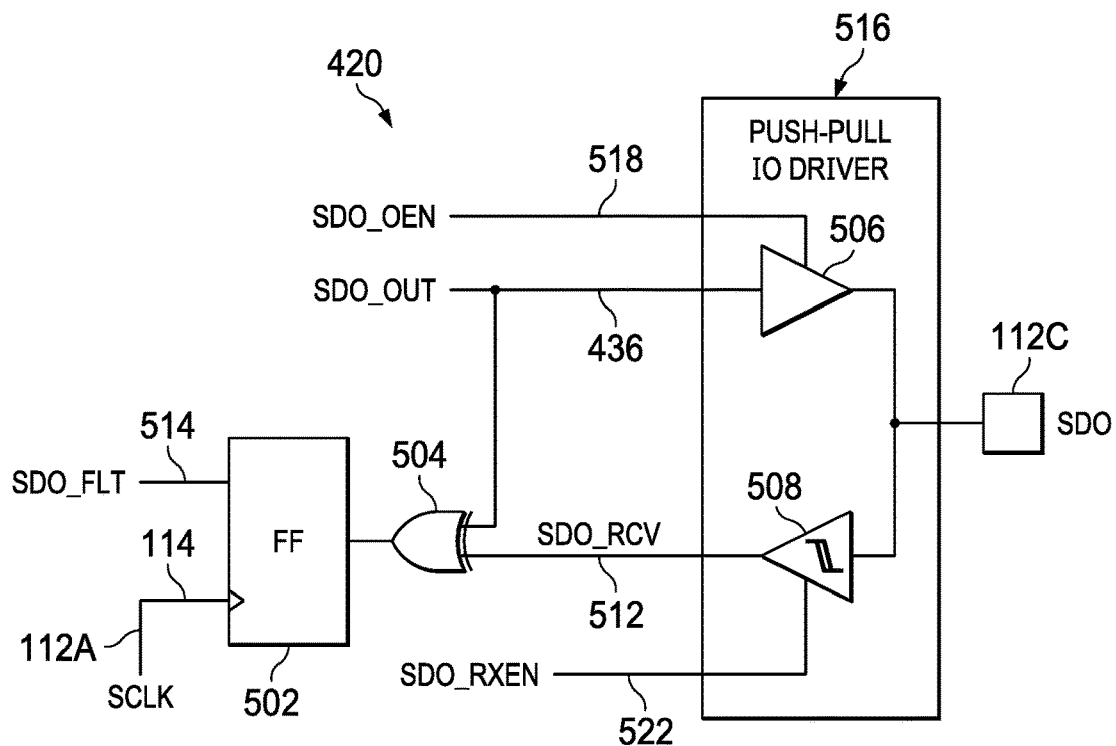
FIG. 5 shows a schematic level diagram for an example conflict detection circuit suitable for use in a synchronous serial bus peripheral interface circuit as described herein.

The conflict detection circuit 420 monitors the serial data output 112C for conflicts that can corrupt data transmitted by the synchronous serial bus peripheral circuit 112. For example, a conflict can occur on the data signal 120 when a peripheral device is asynchronously added to the serial bus and drives the data signal 120. The conflict detection circuit 420 detects such a conflict, and flags the detected conflict as a fault. A conflict may be detected by comparing the data at the serial data output 112C to the data 436 shifted out of the transmitter shift register 404. FIG. 5 shows a schematic level diagram for an example conflict detection circuit 420. The conflict detection circuit 420 includes a flip-flop 502 and an exclusive-OR gate 504. The driver circuit 516 is coupled to the serial data output 112C, and to the transmitter shift register 404 (FIG. 4) for receipt of the data 436 (SDO_OUT) to be driven to the data output 112C. The driver circuit 516 includes a driver 506 and a receiver 508 coupled to the serial data output 112C. The driver and receiver control signals 518 and 522 may be provided by the state machine circuit 406 to enable the driver 506 and the receiver 508 during transmission of the data 436. The receiver control signal 518 enables the driver 506 only when the synchronous serial bus peripheral circuit 112 is selected (when the chip select signal 116 is low, and the peripheral ID stored in the peripheral ID register 428 matches the peripheral ID value that is stored in the peripheral ID register 418). The exclusive-OR gate 504 (or other comparison circuitry) compares the data 436 transmitted by the transmitter shift register 404 to the data signal 120 present at the serial data output 112C, and the flip-flop 502 samples the result of the comparison at an edge of the clock signal 114. A conflict is detected when the data 436 being transmitted by the synchronous serial bus peripheral circuit 112 is different from the data signal 120 present at the serial data output 112C at the edge of the clock signal 114. Responsive to a detected conflict, the synchronous serial bus peripheral circuit 112 may discontinue transmission (e.g., disable drive of the serial data output 112C) for the remainder of the frame, and/or assert a conflict detected flag in transmitted status.

Figure 6:
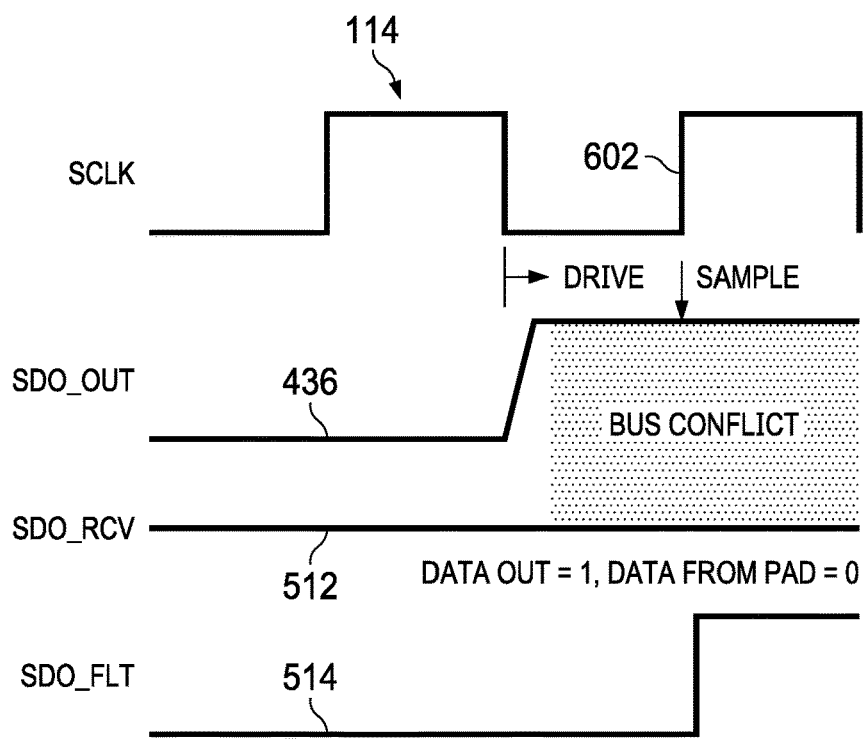
FIG. 6 is a timing diagram of example signals in the conflict detection circuit of FIG. 5.

FIG. 6 shows example signals in the conflict detection circuit 420. At edge 602 of the clock signal 114, data 436 being transmitted by the synchronous serial bus peripheral circuit 112 is different from the data 512 detected at the serial data output 112C. As a result of the difference, the flip-flop 502 sets the conflict fault flag 514.

Figure 7:
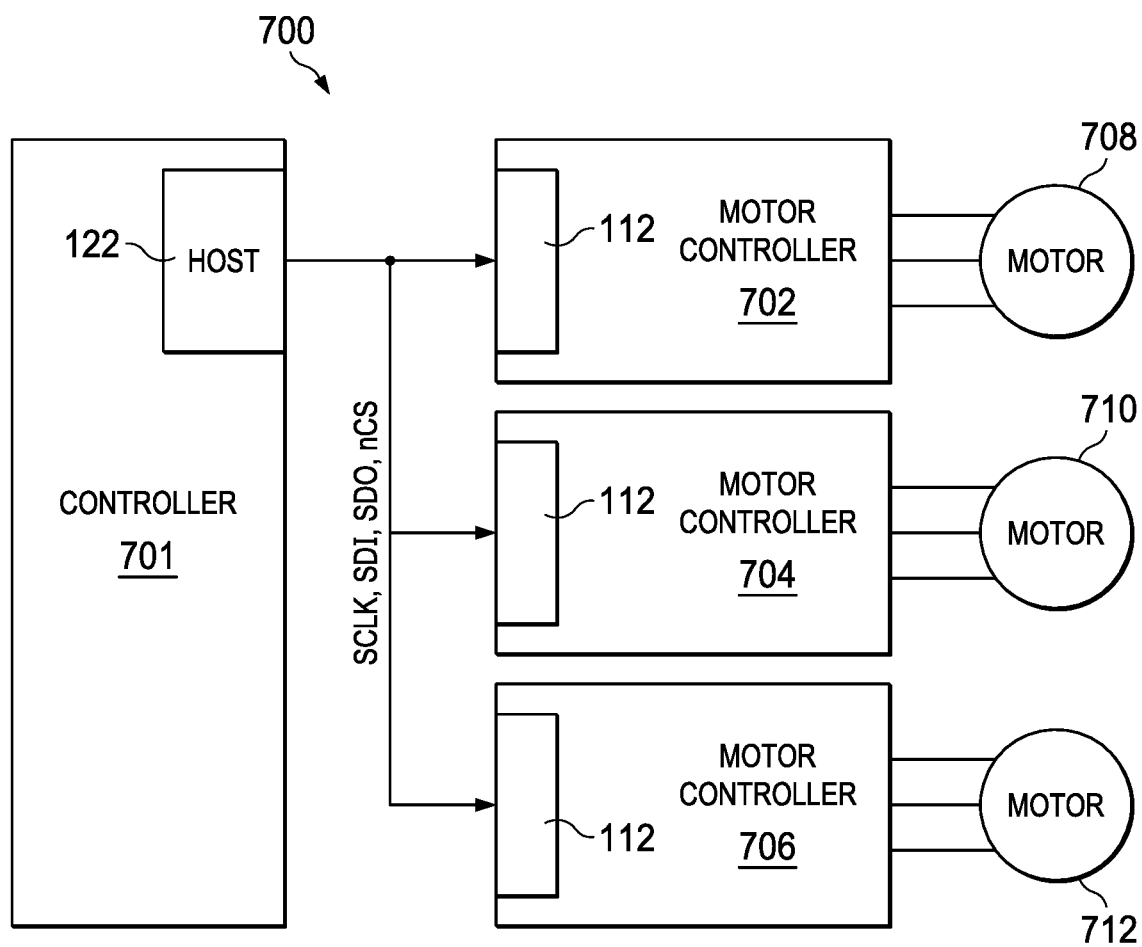
FIG. 7 is a block diagram of an example motor circuit that includes a synchronous serial bus as described herein.

FIG. 7 shows an example motor circuit 700 that includes a synchronous serial bus using the synchronous serial bus peripheral circuit 112. The motor circuit 700 includes a controller 701, motor controller 702, motor controller 704, motor controller 706, motor 708, motor 710, and motor 712. The motors 708, 710 and 712, which may be three-phase electric motors, are respectively coupled to and controlled by the motor controllers 702, 704, and 706, respectively. The motor controllers 702, 704, and 706 are coupled to the controller 701. The controller 701 is an implementation of the controller 102, and may include a microcontroller, logic circuitry, application specific integrated circuitry, memory and/or a combination thereof and may additionally include, in some embodiments, software. Controller 701 may be configured to control the motor controllers 702, 704, and 706. The controller 701 includes the synchronous serial bus host circuit 122, and each of the motor controllers 702, 704, and 706 includes the synchronous serial bus peripheral circuit 112 to enable synchronous serial communication between the controller 701 and the motor controllers 702, 704, and 706. The clock signal 114, chip select signal 116, data signal 118, and data signal 120, are coupled to each of the synchronous serial bus peripheral circuit 112 and to the synchronous serial bus host circuit 122, such that the controller 701 accesses the motor controllers 702, 704, and 706 using framing with peripheral ID-based selection as described herein (e.g., as in FIG. 2). Only a single chip select terminal is needed on the controller 701 to enable communication with motor controllers 702, 704, and 706, which reduces the cost of the controller 701. Use of the general call peripheral ID allows the controller 701 to synchronize operations performed by the motor controllers 702, 704, and 706. For example, the controller 701 may simultaneously write to a register of each of the motor controllers 702, 704, and 706 using the general call peripheral ID such that the motor controllers 702, 704, and 706 simultaneously perform a desired operation, such as synchronously stopping or starting multiple motors.

Figure 8:
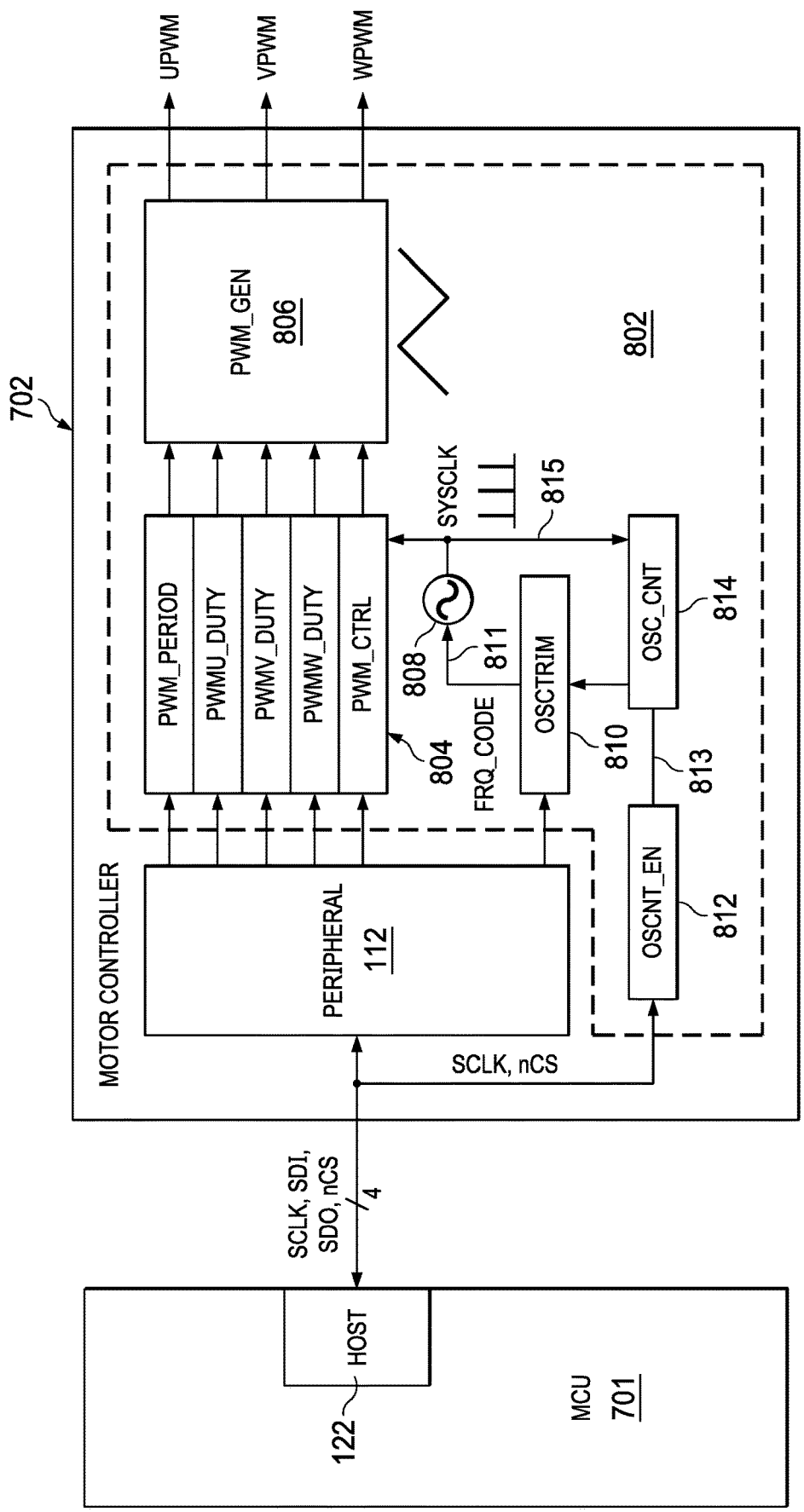
FIG. 8 shows a block diagram for a motor controller that includes a synchronous serial bus peripheral interface circuit as described herein.

FIG. 8 shows a block diagram for a portion of the motor controller 702 that applies the clock signal 114 to stabilize an internal clock. The internal clock may be used to control pulse modulation (PWM) applied to control the motor 708. The circuitry 802 includes PWM control registers 804 that store PWM control values provided by the controller 701 via the synchronous serial bus peripheral circuit 112. The PWM control registers store a PWM period value, PWM duty cycle values for three phases (U, V, and W), and PWM control flags (e.g., PWM enable/disable). A PWM generation circuit 806 applies the PWM control values to generate pulses for controlling transistors that drive a three-phase electrical motor (e.g., the motor 708). In some embodiments, the PWM generation circuit 806 includes a period counter that generates the PWM pulse period based on the PWM period value, and counters that time each of the three duty cycles based on the U, V, and W duty cycle values as a fraction of the period.

The controller 701 relies on synchronization of the PWM signals generated by the motor controller 702 to the timing of the controller 701 to perform functions such as sampling of motor feedback signals at each PWM cycle. Variation in the frequency of the internal clock of the motor controller 702, relative to the clock of the controller 701, can result in a PWM rate that is out of specification or can corrupt sampling by the controller 701. The circuitry 802 synchronizes the internal clock of the motor controller 702 to the clock of the controller 701 to alleviate these issues. In the circuitry 802, a count of clock cycles of the clock signal 114 in a time interval is compared, by the OSCTRIM circuit 810, to a count of clock cycles of the oscillator 808 in the interval. Based on a result of the comparison, the frequency of the oscillator 808 is increased or decreased to set the oscillator frequency to a desired multiple/fraction of the frequency of the clock signal 114. The OSCCNT_EN circuit 812 generates a count enable signal 813 representing a predetermined number of cycles of the clock signal 114. For example, the count enable signal 813 may be active for 7 of every 8 cycles of the clock signal 114. The OSC_CNT circuit 814 synchronizes the count enable signal 813 to the clock 815 generated by the oscillator 808, and counts cycles of the clock 815 while the synchronized version of the count enable signal 813 is active. The OSC_CNT circuit 814 provides the count of cycles of the clock 815 to the OSCTRIM circuit 810 (oscillator trim circuit). Given a desired relationship of the frequency of the clock signal 114 to frequency of the clock 815, the OSCTRIM circuit 810 compares the cycle count values and changes a frequency code 811 provided to the oscillator 808 to adjust the frequency of the clock 815, such that the frequency of the clock 815 better matches the frequency of the clock signal 114 or a predetermined multiple/fraction thereof.

Figure 9:
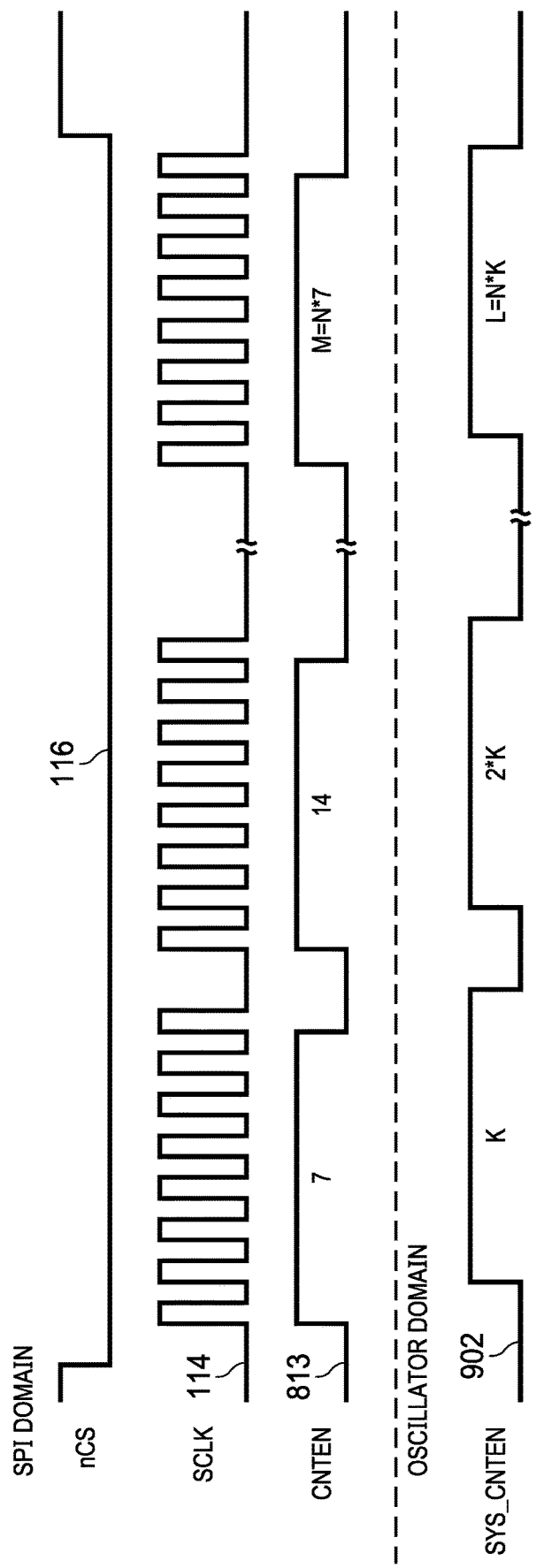
FIG. 9 is a timing diagram of signals generated to synchronize a clock in the motor controller of FIG. 8 to a synchronous serial interface clock.

FIG. 9 shows signals generated in the circuitry 802 as part of synchronization of the clock 815 to the clock signal 114 in the motor controller 702. When the chip select signal 116 is activated to start a frame, the OSCCNT_EN circuit 812 initiates counting of cycles of the clock signal 114 to generate the count enable signal 813. While FIG. 9 shows a single frame, synchronization may involve multiple frames. In FIG. 9, the OSCCNT_EN circuit 812 activates the count enable signal 813 for 7 of every 8 cycles of the clock signal 114 to exclude inter-byte time during which the clock signal 114 is low. Over the frame defined by the chip select signal 116, the number of cycles of the clock signal 114 during activation of the count enable signal 813 is M, where M=N*7 and N is the number of activations of the count enable signal 813. N may be selected (e.g., by the controller 701) to achieve a desired accuracy of synchronization of the clock 815 and the clock signal 114. For example, synchronization accuracy may increase as the number of cycles of the clock signal 114 applied to synchronize the clock 815 increases. The OSC_CNT circuit 814 synchronizes the count enable signal 813 to the clock 815 to produce the synchronized count enable signal 902. For example, the OSC_CNT circuit 814 may include a flip-flop clocked by the clock 815 to synchronize the count enable signal 813. The OSC_CNT circuit 814 counts the number of cycles of the clock 815 generated by the oscillator 808 during each activation of the synchronized count enable signal 902. Over the frame defined by the chip select signal 116, the number of cycles of the clock 815 during activation of the synchronized count enable signal 902 is L, where L=N*K and K is the number of cycles of the clock 815 during an activation of the synchronized count enable signal 902. The OSCTRIM circuit 810 compares M and L, and adjusts the frequency of the clock 815 based on a result of the comparison.

As used herein, the term "couple" may cover connections, communications, or signal paths that enable a functional relationship consistent with this description. For example, if device A provides a signal to control device B to perform an action, then: (a) in a first example, device A is coupled to device B; or (b) in a second example, device A is coupled to device B through intervening component C if intervening component C does not substantially alter the functional relationship between device A and device B, such that device B is controlled by device A via the control signal provided by device A.

Also, as used herein, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, in this description, a circuit or device that includes certain components may instead be adapted to be coupled to those components to form the described circuitry or device. For example, a structure described as including one or more semiconductor elements (such as transistors), one or more passive elements (such as resistors, capacitors and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, such as by an end-user and/or a third party.

As used herein, the terms "terminal", "node", "interconnection" and "pin" are used interchangeably. Unless specifically stated to the contrary, these terms are generally used to mean an interconnection between or a terminus of a device element, a circuit element, an integrated circuit, a device or other electronics or semiconductor component.

Modifications are possible in the described embodiments, and other embodiments are possible, within the scope of the claims.

What is claimed is:

1. A synchronous serial bus peripheral circuit, comprising:
   a peripheral identification (ID) register;
   a receiver shift register; and
   a circuit coupled to the peripheral ID register, and configured to transmit a status value based on a peripheral ID field of data received via the receiver shift register equaling a value stored in the peripheral ID register.

2. The synchronous serial bus peripheral circuit of claim 1, further comprising:
   an address register;
   wherein the circuit is configured to transfer an address value from the receiver shift register to the address register.

3. The synchronous serial bus peripheral circuit of claim 2, wherein the circuit is configured to transmit the status value while shifting the address value into the receiver shift register.

4. The synchronous serial bus peripheral circuit of claim 1, wherein the circuit is configured to determine whether a read operation or a write operation is to be performed based on a read/write field of the data received via the receiver shift register.

5. The synchronous serial bus peripheral circuit of claim 4, further comprising:
   a write data register; and
   a transmitter shift register;
   wherein the circuit is configured to:
      transfer a write data value from the receiver shift register to the write data register based on the read/write field specifying a write operation; and
      transfer a read data value to the transmitter shift register based on the read/write field specifying a read operation.

6. The synchronous serial bus peripheral circuit of claim 1, further comprising:

a conflict detection circuit configured to, while shifting the status value, compare the status value to a value of a serial data output to detect a conflict at the serial data output; and wherein the circuit is configured to disable drive of the serial data output based on detection of the conflict.

7. The synchronous serial bus peripheral circuit of claim 1, further comprising:
a chip select input;
a clock input; and
a serial data input;
wherein the circuit is configured to shift data received at the serial data input into the receiver shift register at an edge of a clock signal received at the clock input based on a chip select signal received at the chip select input being active.

8. A method, comprising:
activating, by a host device coupled to a synchronous serial bus, a chip select signal to initiate a data frame on the synchronous serial bus;
transmitting, by the host device, in the data frame, a peripheral ID value and an address value;
receiving, by a peripheral device coupled to the synchronous serial bus, in the data frame, the peripheral ID value and the address value;
comparing, by the peripheral device, the peripheral ID value to a general call ID and a peripheral ID assigned to the peripheral device; and
responsive to the peripheral ID value being equal to the peripheral ID assigned to the peripheral device, transmitting, by the peripheral device, in the data frame, a status value.

9. The method of claim 8, further comprising deactivating, by the host device, the chip select signal to end the data frame.

10. The method of claim 8, wherein:
the peripheral device is a first peripheral device; and
the method further comprises:
receiving, by a second peripheral device coupled to the synchronous serial bus in parallel with the first peripheral device, the peripheral ID value and the address value;
comparing, by the second peripheral device, the peripheral ID value to the general call ID and a peripheral ID assigned to the second peripheral device; and
responsive to the peripheral ID value being equal to the peripheral ID assigned to the second peripheral device, transmitting, by the second peripheral device, a status value while receiving the address value.

11. The method of claim 10, further comprising:
transmitting, by the host device, in the data frame, a write data value and a read/write value; and
responsive to the read/write value indicating that a write operation is to be performed:
transferring, by the first peripheral device, the write data value to a write data register of the first peripheral device responsive to the peripheral ID value being equal to the general call ID or the peripheral ID assigned to the first peripheral device; and
transferring, by the second peripheral device, the write data value to a write data register of the second peripheral device responsive to the peripheral ID value being equal to the general call ID or the peripheral ID assigned to the second peripheral device.

12. The method of claim 11, further comprising:
transmitting, by the host device, in the data frame, a check value; and
verifying, by the first peripheral device, the write data value based on the check value.

13. The method of claim 11, further comprising:
responsive to the read/write value indicating that a read operation is to be performed:
transmitting, by the first peripheral device, while receiving the write data value, a read data value responsive to the peripheral ID value being equal to the peripheral ID assigned to the first peripheral device; and
transmitting, by the second peripheral device, while receiving the write data value, a read data value responsive to the peripheral ID value being equal to the peripheral ID assigned to the second peripheral device.

14. The method of claim 8, further comprising:
comparing, by the peripheral device, the status value to a to a value of a serial data output while transmitting the status value; and
disabling transmission of the status value responsive to the value of the serial data output being different from the status value.

15. A motor controller, comprising:
a synchronous serial bus peripheral circuit adapted to communicate with an external controller, the synchronous serial bus peripheral circuit including:
a peripheral identification (ID) register;
a receiver shift register; and
a control circuit coupled to the peripheral ID register, and configured to transmit a status value to the external controller based on a peripheral ID field received via the receiver shift register equaling a value stored in the peripheral ID register.

16. The motor controller of claim 15, wherein:
the synchronous serial bus peripheral circuit includes a clock input adapted to receive a serial bus clock signal from the external controller;
the synchronous serial bus peripheral circuit is configured to use the serial bus clock signal to clock the receiver shift register; and
the motor controller includes:
an oscillator configured to generate a clock for timing motor control signals; and
an oscillator trim circuit configured to adjust a frequency of the clock based on a frequency of the serial bus clock signal.

17. The motor controller of claim 16, wherein the oscillator trim circuit is configured to compare a count of cycles of the serial bus clock signal to a count of cycles of the clock to determine a frequency code for adjusting the frequency of the clock.

18. The motor controller of claim 15, wherein the synchronous serial bus peripheral circuit further comprises:
an address register;
wherein the control circuit is configured to:
transfer an address value from the receiver shift register to the address register; and
transmit the status value while shifting the address value into the receiver shift register.

19. The motor controller of claim 15, wherein:
the synchronous serial bus peripheral circuit comprises a write data register; and the control circuit is configured to:
   determine whether a read operation or a write operation is to be performed based on a read/write field received via the receiver shift register;
   transfer a write data value from the receiver shift register to the write data register based on the read/write field specifying a write operation; and
   transfer a read data value to the receiver shift register based on the read/write field specifying a read operation.

20. The motor controller of claim 15, wherein the synchronous serial bus peripheral circuit comprises:
   a conflict detection circuit configured to, while shifting the status value, compare the status value to a value of a serial data output to detect a conflict at the serial data output; and
   wherein the control circuit is configured to disable drive of the serial data output based on detection of conflict.

\* \* \* \* \*